United States Patent
Kaji et al.

(10) Patent No.: US 12,515,418 B2
(45) Date of Patent: Jan. 6, 2026

(54) METHOD OF MANUFACTURING FRP PRODUCT

(71) Applicant: Mitsubishi Chemical Corporation, Tokyo (JP)

(72) Inventors: Satoshi Kaji, Tokyo (JP); Tsuneo Takano, Tokyo (JP); Yuma Furuhashi, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 311 days.

(21) Appl. No.: 17/673,685

(22) Filed: Feb. 16, 2022

(65) Prior Publication Data

US 2022/0168974 A1    Jun. 2, 2022

Related U.S. Application Data

(63) Continuation of application No. PCT/JP2020/031393, filed on Aug. 20, 2020.

(30) Foreign Application Priority Data

Aug. 22, 2019 (JP) ................ 2019-151942
Mar. 6, 2020 (JP) ................ 2020-039300

(51) Int. Cl.
*B29C 70/08* (2006.01)
*B29C 70/14* (2006.01)
(Continued)

(52) U.S. Cl.
CPC ............ *B29C 70/081* (2013.01); *B29C 70/14* (2013.01); *B29C 70/46* (2013.01); *C08J 5/243* (2021.05); *C08J 5/248* (2021.05); *C08J 2363/00* (2013.01)

(58) Field of Classification Search
CPC ....... B29C 70/081; B29C 70/14; B29C 70/46; B29C 70/34; B29C 70/342; B29C 70/345;
(Continued)

(56) References Cited

U.S. PATENT DOCUMENTS 8,617,336 B2   12/2013  Kawamura
2002/0071920 A1*  6/2002  Obeshaw ............... B62D 21/15
                                               428/34.1
(Continued)

FOREIGN PATENT DOCUMENTS

EP        3549741 A1   10/2019
JP        S64-082920 A   3/1989
(Continued)

OTHER PUBLICATIONS

Watanabe, Machine Translation of JPH09109167, generated Jan. 17, 2024 (Year: 1997).*
Wang, Differential scanning calorimetry of the effects of temperature and humidity on phenol-formaldehyde resin cure, 1994, Polymer, vol. 35 No. 26, pp. 5685-5692 (Year: 1994).*
(Continued)

*Primary Examiner* — Andrew L Swanson
(74) *Attorney, Agent, or Firm* — Morgan, Lewis & Bockius LLP

(57) ABSTRACT

Provided is a method of manufacturing a FRP product that is obtained by integrally curing a prepreg where fibers are arranged in a specific direction, such as a unidirectional prepreg, a cloth prepreg, or a tow prepreg and a chopped fiber prepreg, such as a sheet molding compound, in which disorder of fiber arrangement in a portion obtained by curing the prepreg is suppressed to obtain an expected strength.

19 Claims, 7 Drawing Sheets

(51) Int. Cl.
*B29C 70/46* (2006.01)
*C08J 5/24* (2006.01)

(58) Field of Classification Search
CPC ..... B29C 70/347; B29C 70/549; B29C 70/28; B29C 70/54; B29C 70/541; B29C 70/42; B29C 70/461; B29C 70/462; B29C 70/465; B29C 70/467; B29C 70/48; C08J 5/248; C08J 5/243; C08J 2363/00; B32B 37/0076
See application file for complete search history.

(56) References Cited

U.S. PATENT DOCUMENTS

| | | | |
|---|---|---|---|
| 2011/0064908 A1* | 3/2011 | Kweder | B29C 70/345 |
| | | | 428/113 |
| 2013/0242487 A1 | 9/2013 | Fujioka et al. | |
| 2013/0244018 A1* | 9/2013 | Wohlmann | B29C 70/081 |
| | | | 428/221 |
| 2017/0136714 A1* | 5/2017 | Eschl | B29C 70/083 |
| 2018/0297320 A1 | 10/2018 | Fujita et al. | |
| 2018/0326678 A1 | 11/2018 | Villalon et al. | |
| 2020/0039111 A1 | 2/2020 | Tsumura et al. | |
| 2022/0234307 A1* | 7/2022 | Escowitz | B29C 70/745 |

FOREIGN PATENT DOCUMENTS

| | | | |
|---|---|---|---|
| JP | H09109167 A * | 4/1997 | |
| JP | 2004-338270 A | 12/2004 | |
| JP | 2009-083441 A | 4/2009 | |
| JP | 2014-108612 A | 6/2014 | |
| JP | 2016-17111 A | 2/2016 | |
| WO | 2017/073460 A1 | 5/2017 | |
| WO | 2018/101245 A1 | 6/2018 | |
| WO | 2018/147324 A1 | 8/2018 | |
| WO | WO-2018162595 A1 * | 9/2018 | ........... B29C 70/081 |

OTHER PUBLICATIONS

Machine Translation of Hiebeler (WO2018162595A1), 2018 (generated Dec. 23, 2024), Espacenet (Year: 2018).*
International Search Report issued in related International Patent Application No. PCT/JP2020/031393 dated Oct. 20, 2020.
Office Action issued in related Japanese Patent Application No. 2021-540979 dated Jul. 12, 2022.
Extended European Search Report issued in corresponding European Patent Application No. 20853670.6 dated Sep. 14, 2022.
Office Action issued Mar. 28, 2024, for Chinese Patent Application No. 202080057639.7.
Office Action issued in corresponding European Patent Application No. 20853670.6, dated Apr. 28, 2025.

* cited by examiner

METHOD OF MANUFACTURING FRP PRODUCT

This application is a continuation application of International Application No. PCT/JP2020/031393, filed on Aug. 20, 2020, which claims the benefit of priority of the prior Japanese Patent Application No. 2019-151942, filed Aug. 22, 2019 and Japanese Patent Application No. 2020-039300, filed Mar. 6, 2020, the content of which are incorporated herein by reference.

TECHNICAL FIELD

The present invention relates to a method of manufacturing a FRP product.

BACKGROUND ART

Fiber-reinforced plastic (FRP) products are used in a wide range from sport products or leisure products to products of transportation equipment or industrial equipment.

During the manufacturing of a FRP product, a prepreg is used as an intermediate material. The prepreg is a composite material comprising fibers and a matrix resin composition, and examples thereof include a prepreg where fibers are arranged in a specific direction, such as a unidirectional prepreg, a cloth prepreg, or a tow prepreg and a prepreg where fiber tows that are chopped shortly are directed in various in-plane directions, such as a sheet molding compound (SMC).

In a FPR product that is manufactured using the prepreg where fibers are arranged in a specific direction, it is known that when the fiber arrangement is disordered, the strength decreases significantly.

It is known that, by integrally curing a unidirectional prepreg or a cloth prepreg and a SMC, a FRP product having an excellent strength can be manufactured (for example, refer to Patent Document 1).

CITATION LIST

Patent Document

[Patent Document 1]
PCT International Publication No. WO 2018/101245

SUMMARY OF INVENTION

Technical Problem

An object of the present invention is to provide a method of manufacturing a FRP product that is obtained by integrally curing an anisotropic prepreg where fibers are arranged in a specific direction, such as a unidirectional prepreg, a cloth prepreg, or a tow prepreg, with a chopped fiber prepreg, such as a sheet molding compound, by which disorder of fiber arrangement in a portion formed by curing of the former prepreg is suppressed and an expected strength of the FRP product is brought about.

Solution to Problem

Embodiments of the present invention include the following configurations.

[1] A method of manufacturing a FRP product, the method including:

(i) a preforming step of preforming an anisotropic prepreg; and (ii) a compression molding step of integrally curing the anisotropic prepreg preformed in the preforming step and a chopped fiber prepreg in a press mold to obtain a molded product having a boundary between an aligned fiber-reinforced portion derived from the anisotropic prepreg and a chopped fiber-reinforced portion derived from the chopped fiber prepreg, in which by pre-curing the anisotropic prepreg before the compression molding step, disorder of fiber arrangement is suppressed in the aligned fiber-reinforced portion of the molded product obtained in the compression molding step.

[2] The method according to [1], in which a cure degree of the anisotropic prepreg is 6% or more immediately before start of the compression molding step when the cure degree is set as 0% immediately before start of the preforming step.

[3] A method of manufacturing a FRP product, the method including:

(i) a preforming step of preforming an anisotropic prepreg; and (ii) a compression molding step of integrally curing the anisotropic prepreg preformed in the preforming step and a chopped fiber prepreg in a press mold to obtain a molded product having a boundary between an aligned fiber-reinforced portion derived from the anisotropic prepreg and a chopped fiber-reinforced portion derived from the chopped fiber prepreg, in which a cure degree of the anisotropic prepreg is 6% or more immediately before start of the compression molding step when the cure degree is set as 0% immediately before start of the preforming step.

[4] The method according to any one of [1] to [3], in which a cure degree of the anisotropic prepreg is 18% or more or may be 36% or more immediately before start of the compression molding step when the cure degree is set as 0% immediately before start of the preforming step.

[5] The method according to any one of [1] to [4], in which a cure degree of the anisotropic prepreg is 94% or less and may be 60% or less, 50% or less, or 40% or less immediately before start of the compression molding step when the cure degree is set as 0% immediately before start of the preforming step.

[6] The method according to any one of [1] to [5], in which a cure degree of the anisotropic prepreg is 60% or less and may be 50% or less, 40% or less, 30% or less, 20% or less, or 10% or less immediately before start of the compression molding step when the cure degree is set as 0% immediately before start of the preforming step.

[7] The method according to any one of [1] to [6], in which the preforming step includes cutting the anisotropic prepreg.

[8] The method according to any one of [1] to [7], in which the preforming step includes straightening the anisotropic prepreg.

[9] The method according to any one of [1] to [8], in which the preforming step includes forming a preform having a three-dimensional shape from the anisotropic prepreg.

[10] The method according to [9],
in which in the preforming step, the anisotropic prepreg is wound in multiple layers around a shaping mold or a shaping jig.

[11] The method according to any one of [1] to [10],
in which in the preforming step, the anisotropic prepreg is integrated with another anisotropic prepreg.

[12] The method according to any one of [1] to [11],
in which in the preforming step, the anisotropic prepreg is at least partially pre-cured.

[13] The method according to [12],
in which a cure degree of the anisotropic prepreg is 6% or more after completion of the preforming step when the cure degree is set as 0% immediately before start of the preforming step.

[14] The method according to any one of [1] to [13],
in which the anisotropic prepreg is a uniaxial prepreg.

[15] The method according to any one of [1] to [13],
in which the anisotropic prepreg is a multiaxial prepreg.

[16] The method according to any one of [1] to [15],
in which the anisotropic prepreg contains carbon fibers.

[17] The method according to any one of [1] to [16],
in which the chopped fiber prepreg contains carbon fibers.

[18] The method according to any one of [1] to [17],
in which the anisotropic prepreg contains an epoxy resin.

[19] The method according to any one of [1] to [18],
in which the chopped fiber prepreg contains one or more selected from a vinyl ester resin and an unsaturated polyester resin.

[20] The method according to any one of [1] to [18],
in which the chopped fiber prepreg contains an epoxy resin.

[21] The method according to any one of [1] to [20],
in which the chopped fiber prepreg is a sheet molding compound.

[22] The method according to any one of [1] to [21],
in which the aligned fiber-reinforced portion is arranged at a part of a surface of the molded product obtained in the compression molding step such that fibers in the aligned fiber-reinforced portion are parallel to the surface of the molded product.

[23] The method according to any one of [1] to [22],
in which the molded product obtained in the compression molding step has a ridge line on a surface, and
the aligned fiber-reinforced portion where fibers are aligned in one direction is arranged along an entirety or a part of the ridge line such that a direction of the fibers in the aligned fiber-reinforced portion having the fibers aligned in one direction is parallel to the ridge line.

Advantageous Effects of Invention

The present invention provides a method of manufacturing a FRP product that is obtained by integrally curing an anisotropic prepreg where fibers are arranged in a specific direction, such as a unidirectional prepreg, a cloth prepreg, or a tow prepreg, with a chopped fiber prepreg, such as a sheet molding compound integrally, by which disorder of fiber arrangement in a portion formed by curing of the former prepreg is suppressed and an expected strength of the FRP product is brough about.

DESCRIPTION OF EMBODIMENTS

Figure 1:
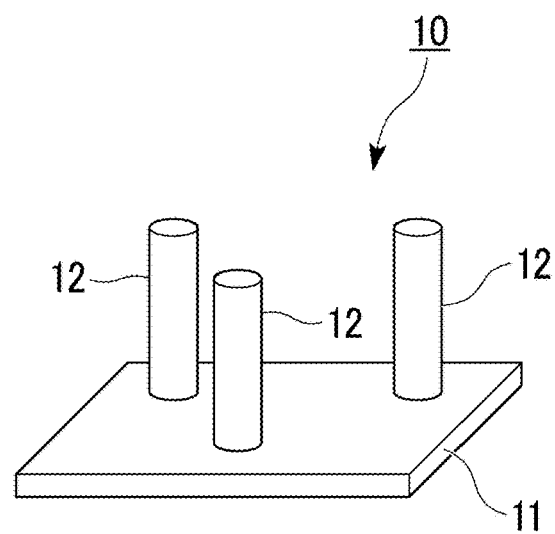
FIG. 1 is a perspective view showing a configuration of a shaping jig that can be used in a preforming step.

Hereinafter, an embodiment of the present invention will be described in detail.

In a method of manufacturing a FRP product according to the embodiment, a prepreg is used.

Examples of fibers in the prepreg include carbon fibers, glass fibers, aramid fibers, boron fibers, silicon carbide fibers, high strength polyethylene, polyparaphenylene benzobisoxazole (PBO) fibers, nylon fibers, and stainless steel fibers. In particular, carbon fibers having a low specific gravity but a high strength are preferable.

A matrix resin composition in the prepreg contains, as a major component, a thermosetting resin such as an epoxy resin, a vinyl ester resin, an unsaturated polyester resin, a polyimide resin, a maleimide resin, or a phenol resin. In particular, thermosetting resins having excellent adhesion with carbon fibers are an epoxy resin and a vinyl ester resin. The matrix resin composition may contain two or more thermosetting resins.

Optionally, various kinds of additives such as a low shrinkage agent, a filler, a flame retardant are mixed with the matrix resin composition.

A thermoplastic resin may be mixed with the matrix resin composition. The mixing amount of the thermoplastic resin is preferably 1% by mass to 30% by mass and may be 15% by mass or less with respect to the total amount of the matrix resin composition. Examples of the thermoplastic resin that can be contained in the matrix resin composition include polyolefins such as polyethylene or polypropylene, polyamides such as nylon 6 or nylon 66, polyesters such as polyethylene terephthalate or polybutylene terephthalate, polyether ketones, polyether sulfones, and aromatic polyamides.

[1. Method of Manufacturing FRP Product]

The method of manufacturing a FRP product according to the embodiment includes at least: (i) a preforming step; and (ii) a compression molding step.

In the method of manufacturing a FRP product according to the embodiment, an anisotropic prepreg is pre-cured before the compression molding step such that disorder of fiber arrangement in an aligned fiber-reinforced portion of a molded product obtained in the compression molding step is suppressed.

According to findings obtained by the present inventors through an experiment, when an anisotropic prepreg was pre-cured such that a cure degree of the anisotropic prepreg was 6% or more immediately before the start of the compression molding step when the cure degree was set as 0% immediately before the start of the preforming step, disorder of fiber arrangement in an aligned fiber-reinforced portion of a molded product obtained in the compression molding step was suppressed.

Hereinafter, the preforming step, the compression molding step, and pre-curing in the method of manufacturing a FRP product according to the embodiment will be described in detail.

[1.1. Preforming Step]

The preforming step is a step of preforming an anisotropic prepreg.

The anisotropic prepreg is a collective term for a uniaxial prepreg and a multiaxial prepreg.

In the uniaxial prepreg, fiber tows are aligned in a single direction. Examples of the uniaxial prepreg include a unidirectional prepreg sheet in which a plurality of fiber tows that are aligned in one direction and are arranged in a single plane are impregnated with the matrix resin composition, a unidirectional prepreg tape obtained by cutting a unidirectional prepreg sheet in a fiber direction, and a tow prepreg (also referred to as pre-impregnated tow) in which a single fiber tow is impregnated with the matrix resin composition.

A prepreg in which a uniaxial non-crimp fabric is impregnated with the matrix resin composition is also one uniaxial prepreg, the uniaxial non-crimp fabric comprising fiber tows aligned in one direction and bonded together by stitching.

A typical example of the multiaxial prepreg is a cloth prepreg in which fabric made of warps and wefts that are formed of fiber tows is impregnated with the matrix resin composition. In the cloth prepreg, fibers are aligned in two directions perpendicular to each other.

A cloth prepreg made of triaxial fabric woven by fiber tows is a multiaxial prepreg in which fibers are aligned in three directions.

A prepreg obtained by impregnating a laminate with the matrix resin composition is one multiaxial prepreg, the laminate comprising a plurality of uniaxial non-crimp fabrics stacked with each other such that axial directions thereof are shifted from each other.

In the present specification and the present invention, the cutting of the anisotropic prepreg is considered as one preforming operation. At a stage of the preforming step, the anisotropic prepreg can have flexibility to the degree that it can cut using small scissors or a small knife having a metal blade.

One example of cutting the anisotropic prepreg having a sheet shape (anisotropic prepreg sheet) in the preforming step is trimming the anisotropic prepreg sheet in a desired planar shape or a desired size.

In the preforming step, a slit can be formed in the anisotropic prepreg sheet. In order to form the slit, a knife can be used. During the formation of the slit, a part of the fiber tows may also be cut, and an object thereof is to prevent a fiber alignment from being disordered, for example, when a preform having a three-dimensional shape is formed from the anisotropic prepreg sheet.

The preforming that is performed on the anisotropic prepreg sheet in the preforming step may include straightening, that is, removing curl for planarization. The anisotropic prepreg sheet can be straightened by interposing the anisotropic prepreg sheet between two flat plates.

The preforming that is performed on the anisotropic prepreg sheet in the preforming step may include deforming the anisotropic prepreg sheet to form a preform having a three-dimensional shape.

During the formation of the preform having a three-dimensional shape, it is preferable that the anisotropic prepreg sheet is deformed by being pressed against a shaping mold. The preform can also be formed by winding the anisotropic prepreg sheet around shaping molds having various shapes. The anisotropic prepreg sheet may be wound in multiple layers.

The preforming that is performed on an elongated anisotropic prepreg such as a prepreg tape or a tow prepreg in the preforming step may include straightening, that is, removing curl for straightness. The elongated anisotropic prepreg can be straightened by applying tension to the elongated anisotropic prepreg.

The preforming that is performed on an elongated anisotropic prepreg such as a prepreg tape or a tow prepreg in the preforming step may include winding the anisotropic prepreg around a shaping mold to form a preform having a three-dimensional shape.

Figure 2:
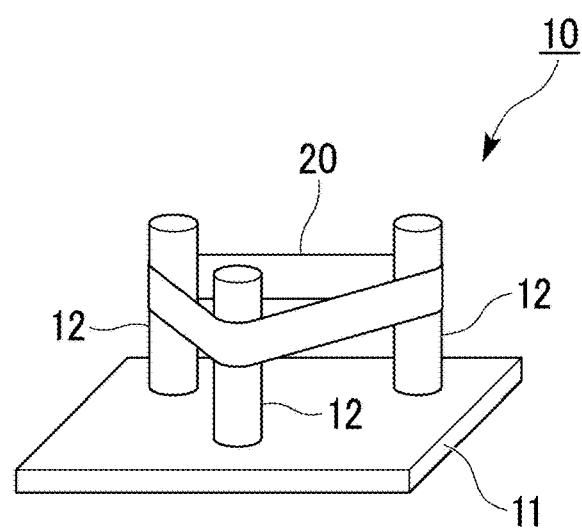
FIG. 2 is a perspective view showing a state where a prepreg tape (or a tow prepreg) is wound around three pins of a shaping jig shown in FIG. 1.
Figure 3:
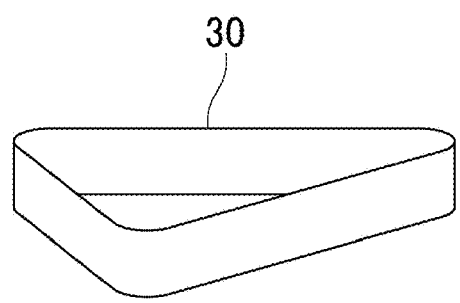
FIG. 3 is a perspective view showing a preform that can be formed by using the shaping jig shown in FIG. 1.

The preform that is performed on the elongated anisotropic prepreg in the preforming step may include winding the prepreg around a shaping jig to form a preform having a three-dimensional shape, the shaping jig including a plurality of pins where a relative arrangement is fixed. A shaping jig 10 shown in FIG. 1 is an example of the shaping jig and includes a plate 11 and three pins 12 that stands on one surface of the plate 11. For example, as shown in FIG. 2, by applying tension to a prepreg tape (or a tow prepreg) 20 and winding the prepreg tape 20 around the three pins 12 of the shaping jig 10, a preform 30 shown in FIG. 3 can be formed.

By changing the number and arrangement of the pins 12 of the shaping jig 10 shown in FIG. 1 and changing a winding method of the prepreg tape (or the tow prepreg) 20, preforms having various shapes can be formed.

When the elongated anisotropic prepreg is wound around a shaping mold or a shaping jig, the elongated anisotropic prepreg may be wound in multiple layers.

When a preform having a three-dimensional shape is formed from a curled anisotropic prepreg, the anisotropic prepreg may be straightened before deforming the anisotropic prepreg in a three-dimensional shape.

In the preforming step, when the anisotropic prepreg is straightened or when a preform having a three-dimensional shape is formed from the anisotropic prepreg, the anisotropic prepreg may be integrated with another anisotropic prepreg.

In the preforming step, the anisotropic prepreg may be optionally heated such that the anisotropic prepreg is plastically deformed easily. The anisotropic prepreg may be heated directly or indirectly, and a heating method is not particularly limited. That is, the anisotropic prepreg may be heated directly using hot air or infrared ray, or the anisotropic prepreg may be heated indirectly by heating the shaping mold or the shaping jig.

[1.2. Compression Molding Step]

The compression molding step is a step of curing the anisotropic prepreg preformed in the preforming step and a chopped fiber prepreg integrally in a press mold to obtain a molded product having a boundary between an aligned fiber-reinforced portion derived from the anisotropic prepreg and a chopped fiber-reinforced portion derived from the chopped fiber prepreg.

The chopped fiber prepreg is a prepreg in which chopped fiber tows (also referred to as "chopped fiber bundles") are impregnated with the matrix resin composition, the chopped fiber tows being obtained by chopping fiber tows at a length of normally 100 mm or less and typically about 50 mm (about 2 inches) or about 25 mm (about 1 inch). Typical examples of the chopped fiber prepreg include a sheet molding compound (SMC) and a bulk molding compound (BMC).

The chopped fiber prepreg exhibits better fluidity during molding as compared to the anisotropic prepreg.

Figure 4:
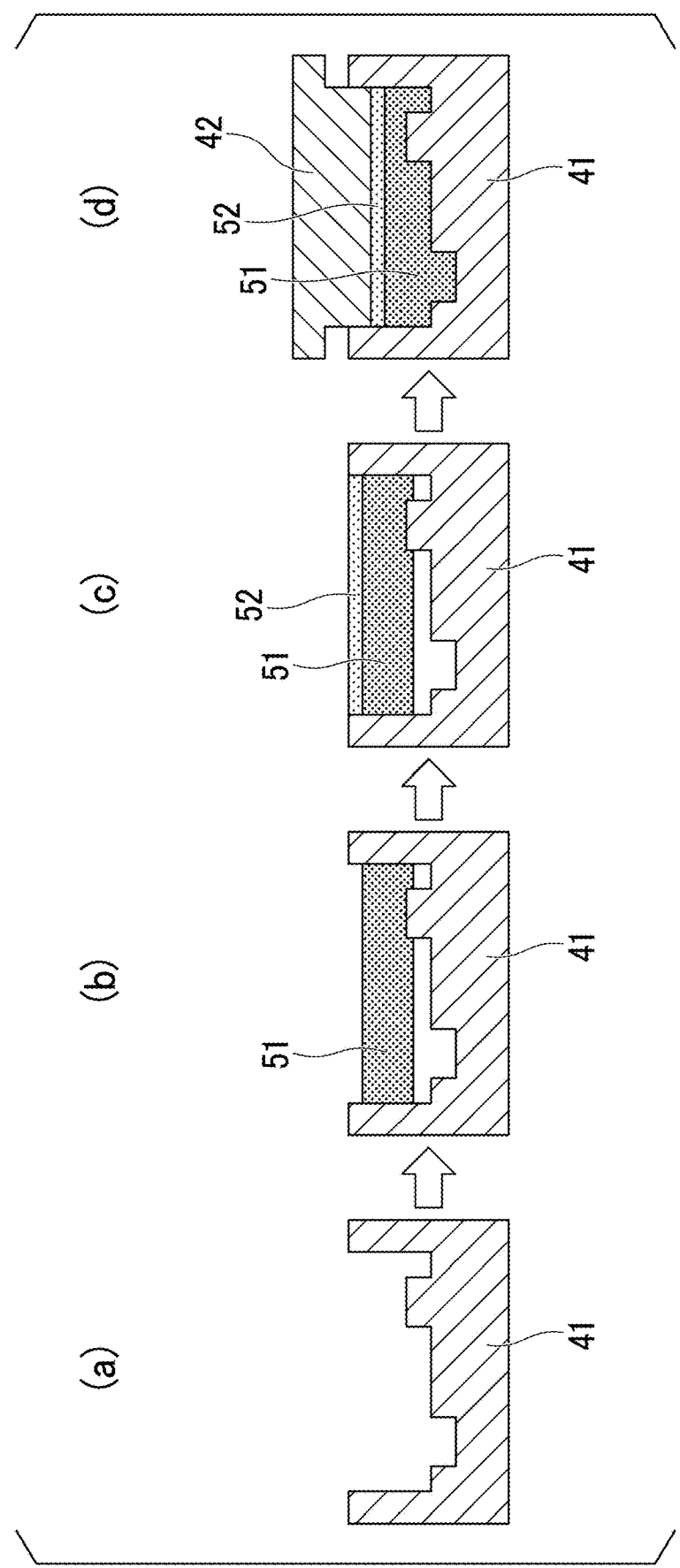
FIG. 4 is a cross-sectional view showing a procedure of curing an anisotropic prepreg and a chopped fiber prepreg integrally.

In the compression molding step, for example, a procedure shown in FIG. 4 can be executed.

FIG. 4(a) is a cross-sectional view showing a lower mold 41 of the press mold.

FIG. 4(b) shows a state where a chopped fiber prepreg (SMC) 51 is arranged in the lower mold 41.

FIG. 4(c) shows a state where an anisotropic prepreg 52 is further arranged in the lower mold 41 and laminated on a part of the chopped fiber prepreg (SMC) 51.

FIG. 4(d) shows a state where an upper mold 42 is lowered such that the chopped fiber prepreg (SMC) 51 and the anisotropic prepreg 52 are heated and compressed.

Figure 5:
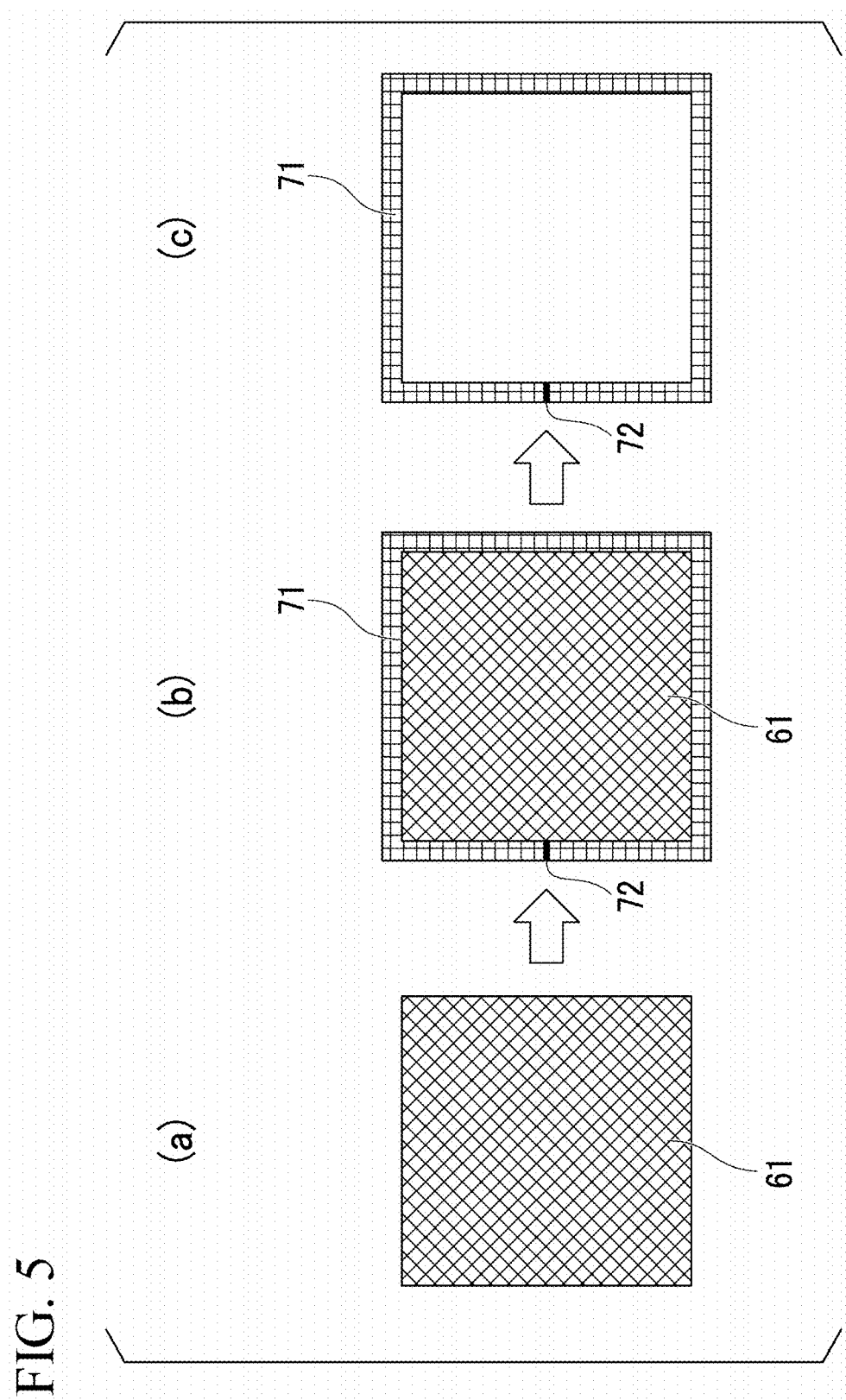
FIG. 5 is a cross-sectional view showing a procedure of curing an anisotropic prepreg and a chopped fiber prepreg integrally.
Figure 6:
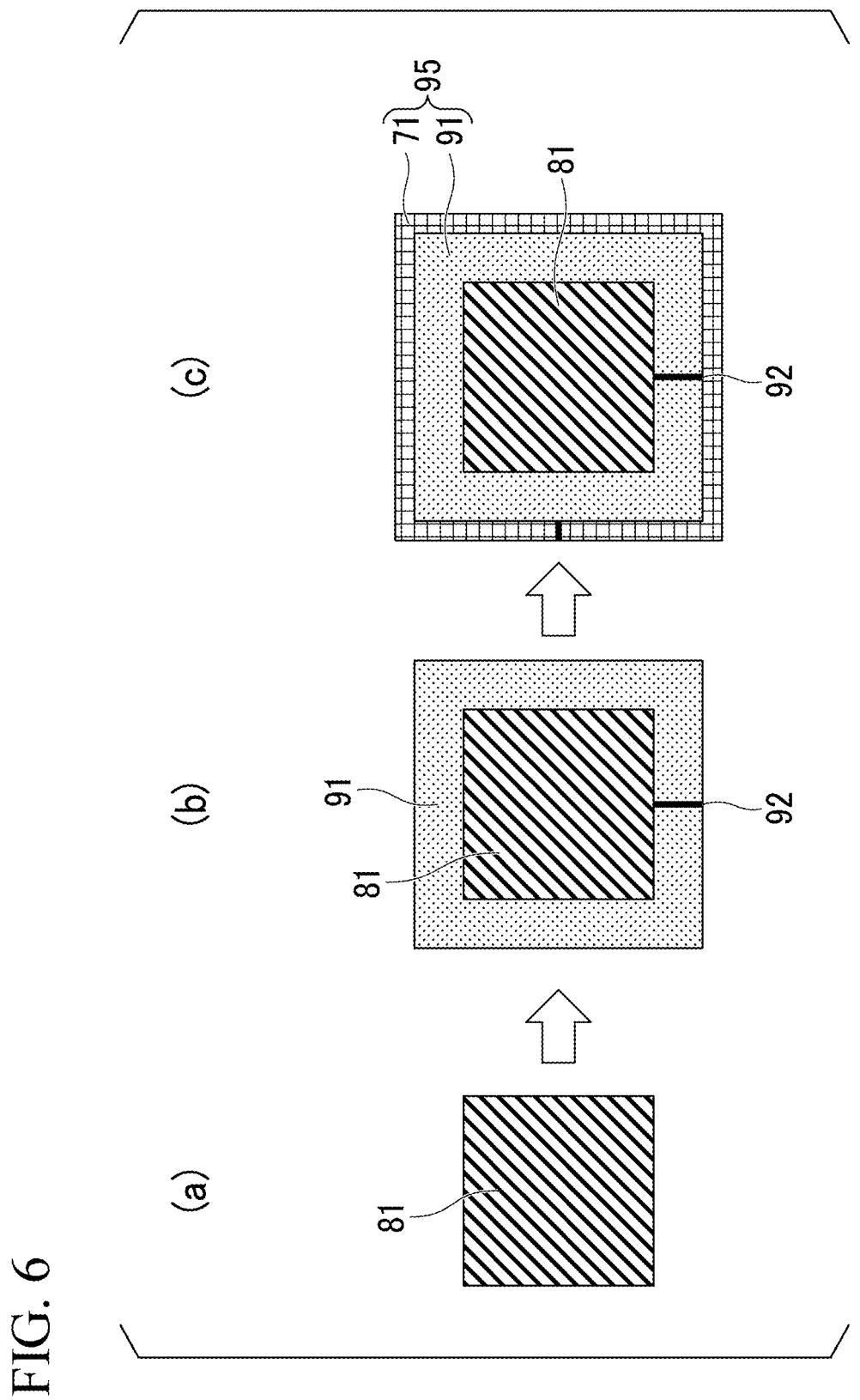
FIG. 6 is a cross-sectional view showing a procedure of curing an anisotropic prepreg and a chopped fiber prepreg integrally.

In other examples, in the compression molding step, procedures shown in FIGS. 5 and 6 can be executed.

FIG. 5(a) is a cross-sectional view showing a shaping mold (or a shaping jig) 61.

FIG. 5(b) shows a state where an anisotropic prepreg 71 is wound around the shaping mold (or the shaping jig) 61 to be preformed. A boundary 72 between prepreg ends present in the preformed anisotropic prepreg 71 may include, without limitation, an overlap of the prepreg ends.

FIG. 5(c) shows a state where the preformed anisotropic prepreg 71 is separated from the shaping mold (or the shaping jig) 61.

FIG. 6(a) is a cross-sectional view showing a core 81 used in the compression molding step.

FIG. 6(b) shows a state where a chopped fiber prepreg (SMC) 91 is wound around the core 81 to be preformed. A boundary 92 between prepreg ends present in the preformed chopped fiber prepreg (SMC) 91 may include, without limitation, a part where the prepreg ends meet.

FIG. 6(c) shows a state where a secondary preform 95 is formed by fitting the preformed anisotropic prepreg 71 to the preformed chopped fiber prepreg (SMC) 91. In the compression molding step, the secondary preform 95 is put into the press mold for each core 81 and is heated and compressed.

Conditions for compression molding can refer to conditions that are used in the related art for compression molding of a FRP product. Although not limited thereto, the molding temperature is, for example, 100° C. to 200° C., the molding pressure is, for example, 1 MPa to 10 MPa, and the molding time is, for example, 1 minute to 20 minutes.

[1.3. Pre-Curing of Anisotropic Prepreg]

An object of pre-curing the anisotropic prepreg before the compression molding step is to suppress the flow of the anisotropic prepreg in the compression molding step by promoting a curing reaction (gelation) in advance such that the disorder of fiber arrangement is suppressed in the aligned fiber-reinforced portion of the obtained compression molded product. Unless the anisotropic prepreg is pre-cured, when the chopped fiber prepreg filled in the press mold together with the anisotropic prepreg flows, the anisotropic prepreg also flows such that the alignment of fibers forming the anisotropic prepreg is disordered.

The pre-curing is performed by heating the anisotropic prepreg.

A useful index for setting pre-curing conditions is a cure degree defined by the following Expression (1).

[Expression (1)]

$$\text{Cure Degree } [\%] = \left(1 - \frac{\text{Residual Amount of Heat Generated } [J/g]}{\text{Total Amount of Heat Generated } [J/g]}\right) \times 100 \quad (1)$$

In Expression (1), each of the total amount of heat generated and the residual amount of heat generated is the amount of heat generated when a sample is heated from room temperature (25° C.) to 300° C. at 10° C./min in a nitrogen atmosphere in differential scanning calorimetry (DSC).

The total amount of heat generated is the amount of heat generated which is exhibited by the anisotropic prepreg immediately before the start of the preforming step. This corresponds to the amount of heat emitted from the anisotropic prepreg in the state immediately before the start of the preforming step until it is completely cured.

The residual amount of heat generated is the amount of heat generated which is exhibited by the anisotropic prepreg at a certain timing after the start of the preforming step, and corresponds to the amount of heat emitted from the anisotropic prepreg until it is completely cured from the certain timing.

In sum, the cure degree described herein represents the degree to which the anisotropic prepreg is cured when the state immediately before the start of the preforming step is set as 0% and the state where the anisotropic prepreg is completely cured is set as 100%.

As shown in experiment results described below, when an anisotropic prepreg having a cure degree of 6% during a heating treatment before the compression molding step and a chopped fiber prepreg are cured integrally in a press mold to obtain a compression molded product, suppression of the disorder of fiber arrangement in the aligned fiber-reinforced portion was found.

In this experiment, the anisotropic prepreg was required to be heated at 80° C. for 2.5 hours until the cure degree thereof reached 6%. This fact means that heating which is performed for the purpose of softening a matrix resin in a B stage when the anisotropic prepreg is preformed in the related art does not act as pre-curing. Because in such a heating, heating time is usually set to be 1 minute or shorter such that a surface temperature does not exceed 80° C., the cure degree of the anisotropic prepreg is not thereby changed substantially.

Typically, cutting that may be performed in the preforming step does not have a substantial effect on the cure degree of the anisotropic prepreg. Accordingly, for example, when the first processing that is performed on the anisotropic prepreg in the preforming step is cutting, the amount of heat generated from the anisotropic prepreg immediately after cutting may be considered as the total amount of heat generated.

It is preferable that the heating treatment as pre-curing is performed such that the cure degree of the anisotropic prepreg immediately before the compression molding step is 6% or more.

When compositions of matrix resins are different from each other, the cure degrees of the anisotropic prepregs obtained through the same heating treatment may be different from each other. But, as a tendency, the higher the temperature of the heating treatment or the longer the time thereof, the higher the cure degree of the prepreg becomes. Accordingly, by performing several trials under different conditions of the heating treatment and feeding the results thereof back, pre-curing conditions for making the anisotropic prepreg to obtain a desired cure degree can be easily set.

According to the experiment that was performed by the present inventors, the cure degree of the anisotropic prepreg immediately before the start of the compression molding step is more preferably 18% or more and still more preferably 36% or more. The pre-curing of the anisotropic prepreg does not have a great effect on the bond strength between the aligned fiber-reinforced portion and the chopped fiber-reinforced portion in the compression molded product. As shown in experiment results described below, when the cure degree of the anisotropic prepreg immediately before the start of the compression molding step is 94%, the anisotropic prepreg and the chopped fiber prepreg can be preferably molded integrally.

The pre-curing can be performed at the same time, for example, when the anisotropic prepreg is straightened in the preforming step, or when a preform having a three-dimensional shape is formed from the anisotropic prepreg in the preforming step.

For example, when a curled anisotropic prepreg sheet is interposed between two plates and is held in this state for straightening, by appropriately setting the temperature of the plates and the holding time, the cure degree of the straightened anisotropic prepreg sheet can be set to any value of 6% or more.

Alternatively, when, in order to straighten a curled unidirectional prepreg tape or tow prepreg, a heating treatment is optionally performed using hot air or an infrared ray while applying tension, the cure degree of the straightened unidirectional prepreg tape or tow prepreg can be set to any value of 6% or more by appropriately setting the temperature and the time of the heat treatment.

In another example, when the anisotropic prepreg is deformed to form a preform having a three-dimensional shape by being pressed against a shaping mold and held or by being wound around a shaping mold or a shaping jig and held, the cure degree of the anisotropic prepreg can be set to any value of 6% or more by putting the anisotropic prepreg into a hot air oven together with the shaping mold or the shaping jig and appropriately setting the holding temperature and the holding time The heating treatment for pre-curing may be performed after completion of the preforming step. For example, the heating treatment for pre-curing may be performed, after straightening of curling, on the anisotropic prepreg that has been removed from the jig used for the straightening. Alternatively, after shaping the preform having a three-dimensional shape using the shaping mold or the shaping jig, the preform may be removed from the jig and then heat-treated for pre-curing.

Of course, the processing that is performed on the anisotropic prepreg in the preforming step may be only cutting.

The heating treatment for pre-curing may be performed multiple times. For example, an additional heating treatment may also be performed, after completion of the preforming step, on the anisotropic prepreg which has been heat-treated in the preforming step.

According to the experiment by the present inventors, it was found that the effect of suppressing the disorder of fiber arrangement in the aligned fiber-reinforced portion of the molded product based on the pre-curing of the anisotropic prepreg tends to be saturated when the cure degree of the anisotropic prepreg immediately before the compression molding step exceeds about 36%. Further, when a change over time in cure degree during the heat treatment of the anisotropic prepreg was investigated, it was found that there was a tendency that the cure degree gently increased at an initial stage, rapidly rose after the cure degree reached 5% to 6%, and gently increased again after the cure degree reached 60%.

Accordingly, from the viewpoint of production efficiency, the cure degree of the anisotropic prepreg immediately before the start of the compression molding step is preferably 60% or less, and may be 50% or less, 40% or less, 30% or less, 20% or less, or 10% or less as long as a necessary and sufficient effect can be obtained in a molded product to be manufactured.

A lower limit value and an upper limit value of the cure degree of the anisotropic prepreg immediately before the start of the compression molding step can be freely combined. For example, the cure degree of the anisotropic prepreg immediately before the start of the compression molding step is 6 to 94%, may be 6% to 60%, 6% to 50%, 6% to 40%, 6% to 30%, 6% to 20%, or 6% to 10%, may be 18% to 94%, 18% to 60%, 18% to 50%, 18% to 40%, 18% to 30%, or 18% to 20%, and may be 36% to 94%, 36% to 60%, 36% to 50%, or 36% to 40%.

[2. Shape of FRP Product]

The method of manufacturing a FRP product according to the embodiment can be preferably used for manufacturing a FRP product having a three-dimensional shape.

In a preferable example of the FRP product manufactured using the method of manufacturing a FRP product according to the embodiment, the aligned fiber-reinforced portion is arranged at a part of a surface of the product such that fibers in the aligned fiber-reinforced portion are parallel to the surface of the product. In particular, in a FRP product having a ridge line on a surface, it is preferable that the aligned fiber-reinforced portion where fibers are aligned in one direction is arranged along an entirety or a part of the ridge line such that the direction of the fibers is parallel to the ridge line.

Figure 7:
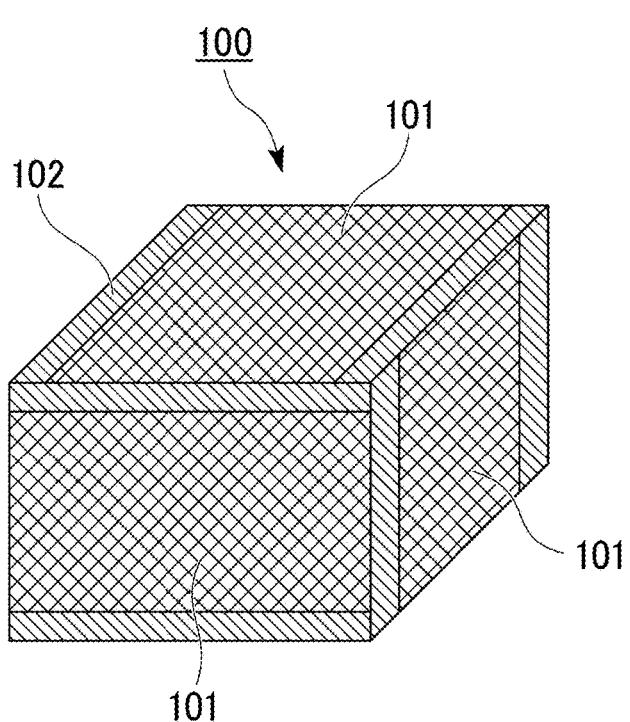
FIG. 7 is a perspective view showing an example of a FRP product that can be manufactured using a manufacturing method according to an embodiment of the present invention.

FIG. 7 is a perspective view showing an example of the FRP product that is manufactured using the method of manufacturing a FRP product according to the embodiment. A FRP product 100 shown in FIG. 7 is a cuboid and has a chopped fiber-reinforced portion 101 that forms each of surfaces (six surfaces) of the cuboid and an aligned fiber-reinforced portion 102 that is arranged along a ridge line of the cuboid. In the aligned fiber-reinforced portion 102, a direction of fibers is parallel to the ridge line.

[3. Experiment Result]

The results of an experiment that was performed by the present inventors will be described below.

Prepregs used in the experiment are as shown in Table 1 below.

TABLE 1

| | Anisotropic Prepreg | | Chopped Fiber Prepreg |
|---|---|---|---|
| Name Fiber | Prepreg Tape Carbon Fiber | Tow Prepreg Carbon Fiber | SMC Carbon Fiber |

TABLE 1-continued

|  | Anisotropic Prepreg | Chopped Fiber Prepreg |
|---|---|---|
| Main Component of Matrix Resin Composition | Epoxy Resin | Epoxy Resin | Vinyl Ester Resin |
| Product Name | PYROFIL (Registered Trade Name) TR361E250S | — | PYROFIL (Registered Trade Name) STR120N131 |
| Manufacturer | Mitsubishi Chemical Corporation | — | Mitsubishi Chemical Corporation |
| Note | Cut from Unidirectional Prepreg Sheet | Tow Prepreg | Sheet Molding Compound |

A tow prepreg was prepared using a method including spreading a carbon fiber tow (PYROFIL (registered trade name) TRW 40 50 L manufactured by Mitsubishi Chemical Corporation) having 50000 filaments and impregnating the carbon fiber tow with an epoxy resin using a melt method. In the prepared tow prepreg, the width was 12.7 mm, the maximum thickness was 0.3 mm, and the resin content was 38%.

In any experiment, in the measurement of the amount of heat generated for obtaining the cure degree of the anisotropic prepreg, a differential scanning calorimetry (DSC) apparatus Q-1000 (manufactured by TA Instruments) was used.

In DSC, 5 mg to 10 mg of samples were heated from room temperature (25° C.) to 300° C. at 10° C./min in a nitrogen atmosphere.

In DSC, the samples were collected at three positions close to one end of a prepreg tape or a tow prepreg, and the average value of the amounts of heat generated from the samples was obtained as the amount of heat generated from the prepreg tape or the tow prepreg.

[Experiment 1]

A prepreg tape having a length of 285 mm, a width of 25 mm, and a thickness of 0.2 mm and whose longitudinal direction was a fiber direction was cut from a unidirectional prepreg sheet (PYROFIL (registered trade name) TR361E250S manufactured by Mitsubishi Chemical Corporation) having a resin content of 30%, was put into a hot air oven, and was held at 80° C. for 4 hours. The cure degree of the prepreg tape after the heat treatment was 19%.

The heat treated prepreg tape was put into a cavity of a press mold (lower mold) together with a SMC having a thickness of 2 mm and cut into a size of 295 mm square.

Figure 8:
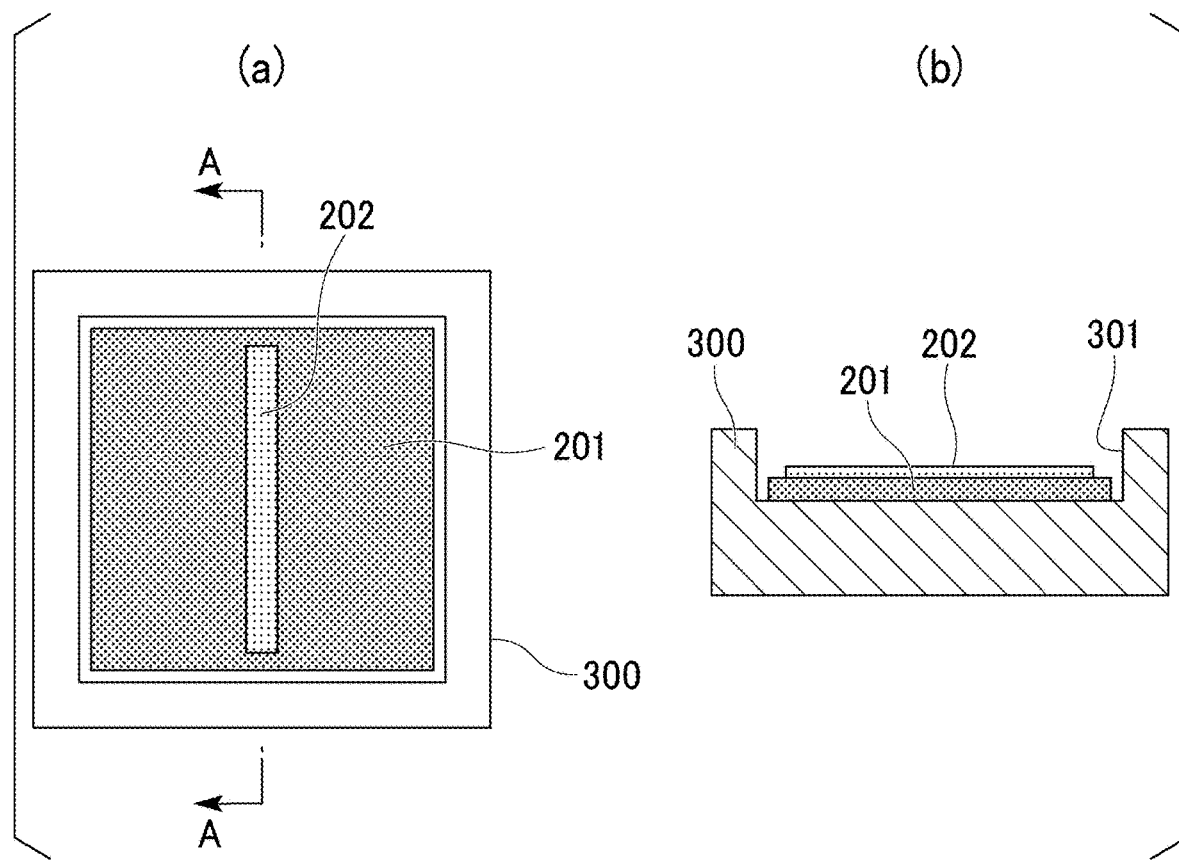
FIG. 8 shows a state where the prepreg tape and a SMC are arranged in a press mold (lower mold), in which (a) is a plan view and (b) is a cross-sectional view taken along line A-A.

As shown in (a) (plan view) and (b) (cross-sectional view) of FIG. 8, a SMC 201 was horizontally placed on a bottom surface of a cavity 301 of a press mold 300, and a prepreg tape 202 was arranged on an upper surface of the SMC 201 such that a longitudinal direction thereof was parallel to two opposite sides of the SMC 201.

The cavity bottom surface of the press mold 300 had a size of 300 mm square. Therefore, a SMC charge rate obtained by dividing the area of the SMC by the area of the bottom surface of the cavity was 93%.

Figure 9:
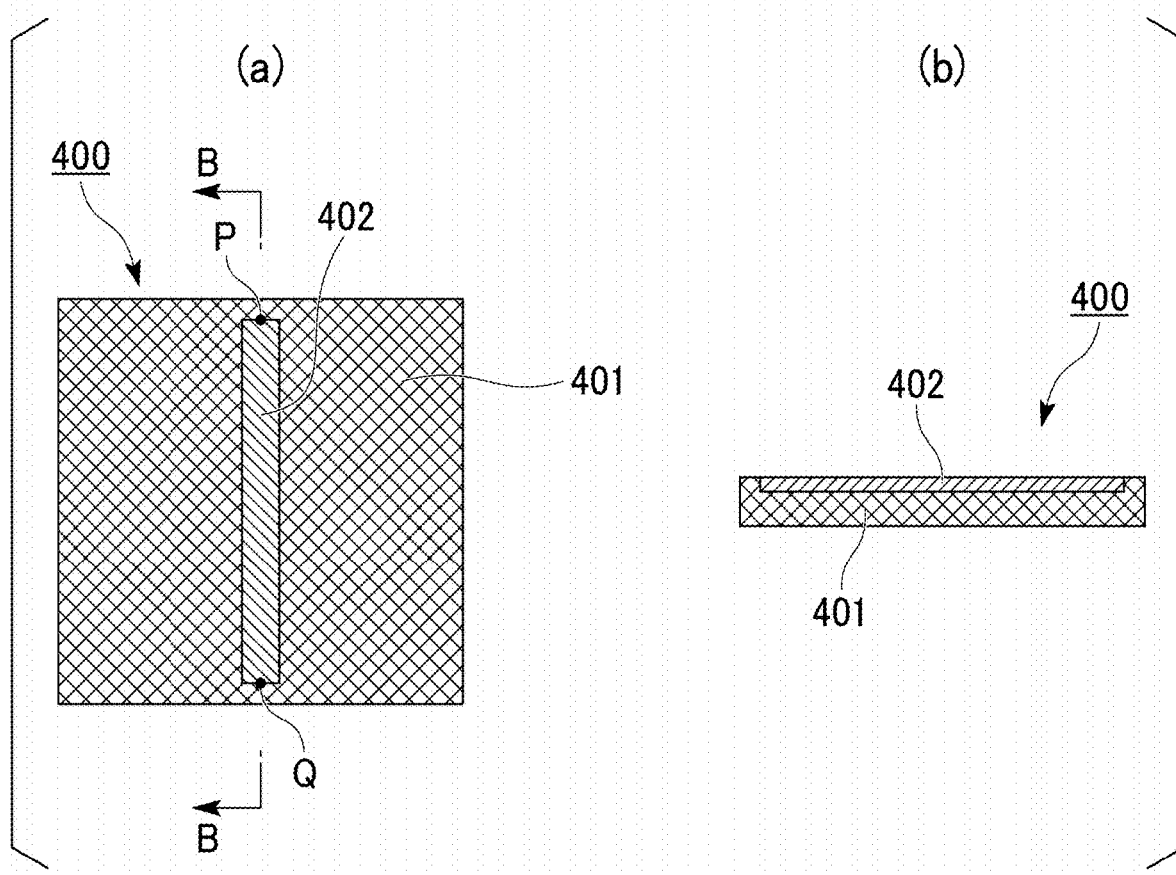
FIG. 9 shows a compression molded product, in which (a) is a plan view and (b) is a cross-sectional view taken along line B-B.

The SMC 201 and the prepreg tape 202 were integrally cured under conditions of pressure: 4 MPa, temperature: 140° C., and curing time: 5 minutes. As a result, a compression molded product 400 having a size of 300 mm square and a thickness of 2 mm shown in (a) (plan view) and (b) (cross-sectional view) of FIG. 9, in which a surface of a chopped fiber-reinforced portion 401 and a surface of an aligned fiber-reinforced portion 402 were coplanar, was obtained.

In the obtained compression molded product 400, when a direction of a line segment PQ connecting a middle point (point P shown in FIG. 9(a)) of one end of the aligned fiber-reinforced portion 402 in a width direction and a middle point (point Q shown in FIG. 9(a)) of another end of the aligned fiber-reinforced portion 402 in the width direction is set as a reference direction, a portion where a direction of fibers deviated from the reference direction was able to be visually recognized in the aligned fiber-reinforced portion 402. A deviation angle of the fibers (angle between the fibers and the reference direction) in such a portion was 6° at a maximum in the aligned fiber-reinforced portion 402.

[Experiment 2]

A compression molded product was prepared in the same manner as Experiment 1, except that the heating time (holding time at 80° C.) during the heat treatment of the prepreg tape was changed to 5 hours. The cure degree of the prepreg tape after the heat treatment was 48%.

In the aligned fiber-reinforced portion of the compression molded product, a portion where a direction of fibers deviated from the reference direction was not able to be visually recognized. That is, a deviation angle of the fibers was 0° in the aligned fiber-reinforced portion.

[Experiment 3]

A compression molded product was prepared in the same manner as Experiment 1, except that a cut tow prepreg having a length of 285 mm was used instead of the prepreg tape and the heating time (holding time at 80° C.) during the heat treatment of the tow prepreg was changed to 2.5 hours. The cure degree of the tow prepreg after the heat treatment was 6%.

In the aligned fiber-reinforced portion of the compression molded product, a portion where a direction of fibers deviated from the reference direction was able to be visually recognized. A maximum value of a deviation angle of the fibers was 6° in the aligned fiber-reinforced portion.

[Experiment 4]

A compression molded product was prepared in the same manner as Experiment 1, except that a cut tow prepreg having a length of 285 mm was used instead of the prepreg tape cut from the unidirectional prepreg sheet and that the heating time (holding time at 80° C.) during the heat treatment of the tow prepreg was changed to 3 hours. The cure degree of the tow prepreg after the heat treatment was 18%.

In the aligned fiber-reinforced portion of the compression molded product, a portion where a direction of fibers deviated from the reference direction was able to be visually recognized. A maximum value of a deviation angle of the fibers was 5° in the aligned fiber-reinforced portion.

[Experiment 5]

A compression molded product was prepared in the same manner as Experiment 3, except that the heating time (holding time at 80° C.) during the heat treatment of the tow prepreg was changed to 3.5 hours. The cure degree of the tow prepreg after the heat treatment was 36%.

In the aligned fiber-reinforced portion of the compression molded product, a portion where a direction of fibers deviated from the reference direction was not able to be visually recognized. That is, a deviation angle of the fibers was 0° in the aligned fiber-reinforced portion.

[Comparative Experiment 1]

A compression molded product was prepared in the same manner as Experiment 1, except that the prepreg tape was not heat treated.

In the aligned fiber-reinforced portion of the compression molded product, a portion where a direction of fibers deviated from the reference direction was able to be visually recognized. A maximum value of a deviation angle of the fibers was 12° in the aligned fiber-reinforced portion.

[Comparative Experiment 2]

A compression molded product was prepared in the same manner as Experiment 3, except that the tow prepreg was not heat treated.

In the aligned fiber-reinforced portion of the compression molded product, a portion where a direction of fibers deviated from the reference direction was able to be visually recognized. A maximum value of a deviation angle of the fibers was 9° in the aligned fiber-reinforced portion.

The results of Experiments 1 to 5 and Comparative Experiments 1 and 2 are shown in Tables 2 and 3.

TABLE 2

|  | Experiment 1 | Experiment 2 | Experiment 3 | Experiment 4 | Experiment 5 |
| --- | --- | --- | --- | --- | --- |
| SMC Charge Rate [%] | 93 | 93 | 93 | 93 | 93 |
| Cure Degree of Anisotropic Prepreg after Heating Treatment [%] | 19 | 48 | 6 | 18 | 36 |
| Maximum Value of Deviation Angle of Fibers in Aligned Fiber-Reinforced Portion [Degree] | 6 | 0 | 6 | 5 | 0 |
| Anisotropic Prepreg | Prepreg Tape | | Tow Prepreg | | |

TABLE 3

|  | Comparative Experiment 1 | Comparative Experiment 2 |
| --- | --- | --- |
| SMC Charge Rate [%] | 93 | 93 |
| Cure Degree of Anisotropic Prepreg after Heating Treatment [%] | 0 | 0 |
| Maximum Value of Deviation Angle of Fibers in Aligned Fiber-Reinforced Portion [Degree] | 12 | 9 |
| Anisotropic Prepreg | Prepreg Tape | Tow Prepreg |

[Experiment 6]

With the compression molded product obtained by curing the pre-cured anisotropic prepreg integrally with the chopped fiber prepreg, an experiment for evaluating a bond strength at an interface between the aligned fiber-reinforced portion and the chopped fiber-reinforced portion was performed.

First, ten strips each having a length of 75 mm, a width of 25 mm, and a thickness of 0.2 mm and having a fiber direction as a longitudinal direction were cut from the prepreg sheet and were stacked and then bonded to each other by vacuum debulking to obtain a laminate. This laminate was put into a hot air oven and was held at 80° C. for 8 hours to obtain a thick strip formed by integration of the ten strips. The cure degree of the thick strip was 94%.

Figure 10:
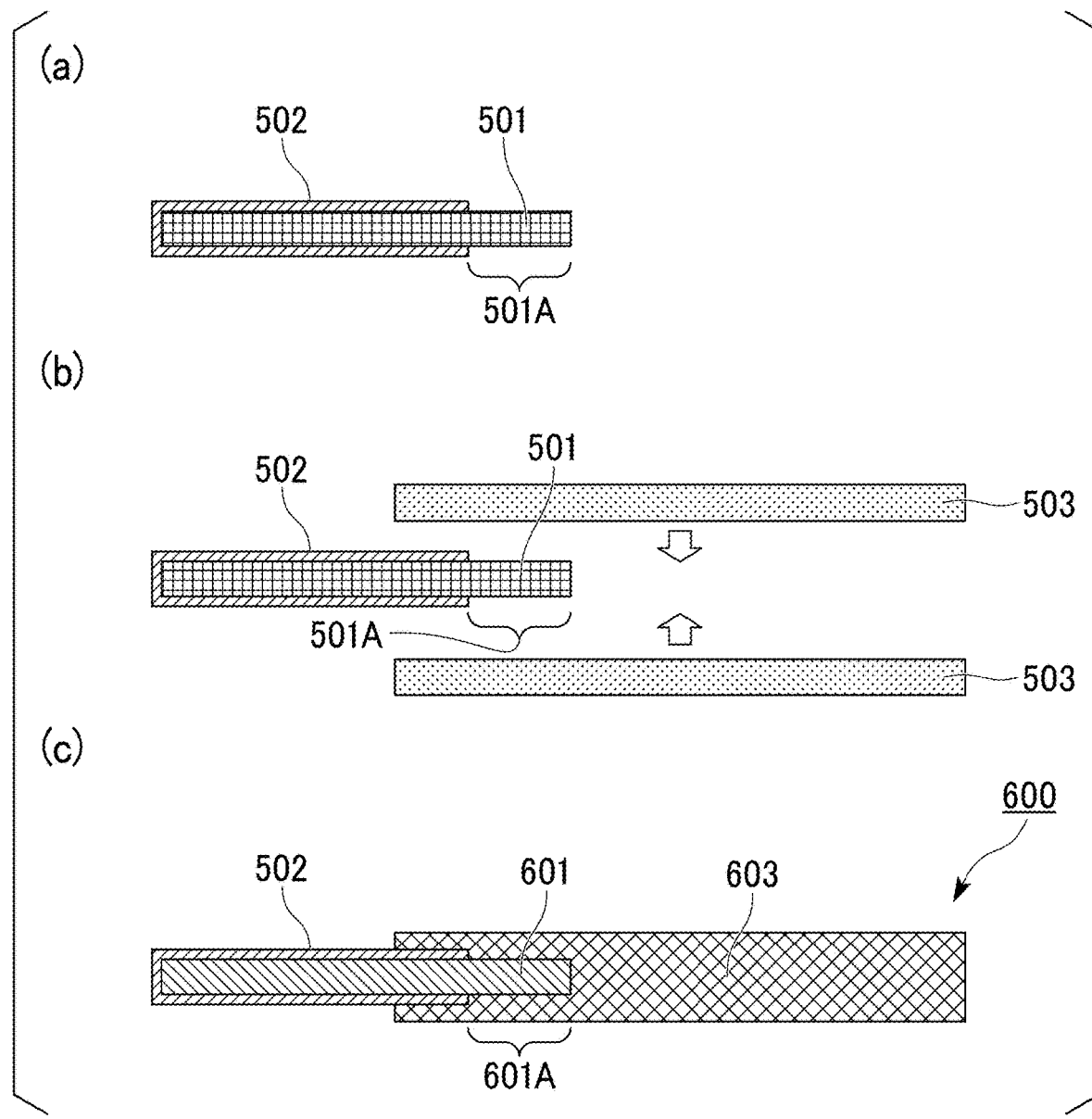
FIG. 10 is a cross-sectional view showing a procedure for preparing a test piece used in Experiment 6.

Next, as shown in the cross-sectional view of FIG. 10(a), by winding a temperature-resistant tape 502 around a part of a thick strip 501, only one end portion 501A of the thick strip 501 was exposed by a predetermined area.

Further, as shown in the cross-sectional view of FIG. 10(b), the side with the end portion 501A of the thick strip 501 was interposed between two cut SMCs 503 each having a thickness of 2 mm, a length of 70 mm, and a width of 28 mm, and press-molding was then performed under conditions of 140° C. to 150° C. and 5 minutes for preparing a test piece 600 shown in FIG. 10(c) including an aligned fiber-reinforced portion 601 and a chopped fiber-reinforced portion 603.

The aligned fiber-reinforced portion 601 is a portion obtained by curing the thick strip 501, and the chopped fiber-reinforced portion 603 is a portion obtained by curing the SMC 503.

By performing a tensile test using a universal testing machine 4482 (manufactured by Instron), a strength at an interface between the aligned fiber-reinforced portion 601 and the chopped fiber-reinforced portion 603 in the test piece 600 was evaluated. In the tensile test, a load cell having a load capacity of 100 kN was used, and the tension rate was set to 0.5 mm/min. The test piece was broken at the interface between the aligned fiber-reinforced portion 601 and the chopped fiber-reinforced portion 603. A shear strength of the interface calculated from the load at the break and a contact area between the aligned fiber-reinforced portion and the chopped fiber-reinforced portion was 17 (N/mm$^2$).

[Comparative Experiment 3]

A comparative test piece was prepared in the same manner as the test piece in Experiment 6, except that a metal strip formed of SUS304 around which a non-heat treated prepreg tape was wound was used instead of the thick strip formed of the heat treated prepregs.

The prepreg tape was cut from the prepreg sheet such that a fiber direction thereof was a longitudinal direction, and the width thereof was 25 mm. The metal strip had a length of 75 mm, a width of 28 mm, and a thickness of 2 mm.

When the prepreg tape was wound, the fiber direction thereof was set to be parallel to the longitudinal direction of the metal strip.

When the temperature-resistant tape was wound, the area of the interface between the aligned fiber-reinforced portion and the chopped fiber-reinforced portion in the comparative test piece was set to be the same as that of the test piece according to Experiment 6.

When the tensile test was performed in the same manner as Experiment 6, the comparative test piece was also broken at the interface between the aligned fiber-reinforced portion and the chopped fiber-reinforced portion. A shear strength of the interface calculated from the load at the break and a contact area between the aligned fiber-reinforced portion and the chopped fiber-reinforced portion was 16.7 (N/mm$^2$), which was substantially the same as that of the test piece of Experiment 6.

This result shows that, even when the cure degree of the anisotropic prepreg is increased up to 94% through pre-curing, in the compression molded product obtained by integrally curing the pre-cured anisotropic prepreg and the chopped fiber prepreg, the strength at the interface between the aligned fiber-reinforced portion and the chopped fiber-reinforced portion can be sufficiently secured.

INDUSTRIAL APPLICABILITY

The method of manufacturing a FRP product according to the present invention can be used not only for manufacturing FRP parts used in transportation equipment or industrial equipment but also for manufacturing FRP-made sporting goods or leisure goods. The method of manufacturing a FRP product according to the present invention is particularly suitable for manufacturing FRP automobile components.

REFERENCE SIGNS LIST

10: Shaping jig
11: Plate
12: Pin
20: Prepreg tape (or tow prepreg)
30: Preform
41: Lower mold
42: Upper mold
51: Chopped fiber prepreg
52: Anisotropic prepreg
61: Shaping jig
71: Anisotropic prepreg
81: Core
91: Chopped fiber prepreg
95: Secondary preform
100: FRP product
101: Chopped fiber-reinforced portion
102: Aligned fiber-reinforced portion
201: SMC
202: Prepreg tape
300: Press mold (lower mold)
301: Cavity
400: Compression molded product
401: Chopped fiber-reinforced portion
402: Aligned fiber-reinforced portion
501: Thick strip
502: Temperature-resistant tape
503: SMC
600: Test piece
601: Aligned fiber-reinforced portion
603: Chopped fiber-reinforced portion

The invention claimed is:

1. A method of manufacturing a fiber-reinforced plastic (FRP) product, the method comprising:
preforming a uniaxial anisotropic prepreg comprising an epoxy resin, the performing comprising
straightening the uniaxial anisotropic prepreg by interposing the uniaxial anisotropic prepreg between two flat plates;
placing the uniaxial anisotropic prepreg preformed in the preforming on a portion of a surface of a chopped fiber prepreg in a press mold; and
compression molding by compressing at least a surface of the uniaxial anisotropic prepreg and the surface of the chopped fiber prepreg, and integrally curing the anisotropic prepreg and the chopped fiber prepreg integrally to obtain a molded product having a boundary between an aligned fiber-reinforced portion derived from the uniaxial anisotropic prepreg and a chopped fiber-reinforced portion derived from the chopped fiber prepreg, in which a surface of the chopped fiber-reinforced portion and a surface of the aligned fiber-reinforced portion are arranged on the same surface of the molded product as the surface compressed by the mold, such that the uniaxial anisotropic prepreg is embedded in the chopped fiber prepreg,
wherein, the method further comprises, after starting the preforming the uniaxial anisotropic prepreg and before the compression molding, precuring the uniaxial anisotropic prepreg to prevent disorder of a fiber arrangement in the aligned fiber-reinforced portion of the molded product obtained in the compression molding.

2. The method according to claim 1,
wherein a cure degree of the anisotropic prepreg is 6% or more immediately before start of the compression molding when the cure degree is set as 0% immediately before start of the preforming.

3. The method according to claim 1,
wherein a cure degree of the uniaxial anisotropic prepreg is 18% or more immediately before start of the integral curing when the cure degree is set as 0% immediately before start of the preforming.

4. The method according to claim 1,
wherein a cure degree of the uniaxial anisotropic prepreg is 94% or less immediately before start of the integral curing when the cure degree is set as 0% immediately before start of the preforming.

5. The method according to claim 1,
wherein a cure degree of the uniaxial anisotropic prepreg is 60% or less immediately before start of the integral curing when the cure degree is set as 0% immediately before start of the preforming.

6. The method according to claim 1,
wherein the preforming includes forming a preform having a three-dimensional shape from the uniaxial anisotropic prepreg, and the uniaxial anisotropic prepreg is wound in multiple layers around a shaping mold or a shaping jig.

7. The method according to claim 1,
wherein in the preforming, the uniaxial anisotropic prepreg is integrated with another anisotropic prepreg.

8. The method according to claim 1,
wherein in the preforming, the uniaxial anisotropic prepreg is at least partially pre-cured.

9. The method according to claim 8,
wherein a cure degree of the uniaxial anisotropic prepreg is 6% or more after completion of the preforming when the cure degree is set as 0% immediately before start of the preforming.

10. The method according to claim 1,
wherein the uniaxial anisotropic prepreg further comprises a layer including a uniaxial prepreg.

11. The method according to claim 1,
wherein the uniaxial anisotropic prepreg contains carbon fibers.

12. The method according to claim 1,
wherein the chopped fiber prepreg contains carbon fibers.

13. The method according to claim 1,
wherein the uniaxial anisotropic prepreg contains an epoxy resin.

14. The method according to claim 1,
wherein the chopped fiber prepreg contains one or more selected from a vinyl ester resin and an unsaturated polyester resin.

15. The method according to claim 1,
wherein the chopped fiber prepreg contains an epoxy resin.

16. The method according to claim 1,
wherein the chopped fiber prepreg is a sheet molding compound.

17. The method according to claim 1,
wherein the aligned fiber-reinforced portion is arranged at a part of a surface of the molded product obtained in the integral curing such that fibers in the aligned fiber-reinforced portion are parallel to the surface of the molded product.

18. The method according to claim 1,
wherein the molded product obtained in the integral curing has a ridge line on a surface, and
the aligned fiber-reinforced portion where fibers are aligned in one direction is arranged along an entirety or a part of the ridge line such that a direction of the fibers in the aligned fiber reinforced portion having the fibers aligned in one direction is parallel to the ridge line.

19. A method of manufacturing a fiber-reinforced plastic (FRP) product, the method comprising:
preforming an anisotropic prepreg;
placing the anisotropic prepreg preformed in the preforming on a portion of a surface of a chopped fiber prepreg in a press mold; and
compression molding by compressing at least a surface of the anisotropic prepreg and the surface of the chopped fiber prepreg, and integrally curing the anisotropic prepreg and the chopped fiber prepreg integrally to obtain a molded product having a boundary between an aligned fiber-reinforced portion derived from the anisotropic prepreg and a chopped fiber-reinforced portion derived from the chopped fiber prepreg, in which a surface of the chopped fiber-reinforced portion and a surface of the aligned fiber-reinforced portion are arranged on the same surface of the molded product as the surface compressed by the mold, such that the anisotropic prepreg is embedded in the chopped fiber prepreg,
wherein, the method further comprises, after starting the preforming the anisotropic prepreg and before the compression molding, precuring the anisotropic prepreg to prevent disorder of a fiber arrangement in the aligned fiber-reinforced portion of the molded product obtained in the compression molding.

\* \* \* \* \*